United States Patent
Azumi et al.

(10) Patent No.: US 8,578,813 B2
(45) Date of Patent: Nov. 12, 2013

(54) PARKING BRAKE SYSTEM

(75) Inventors: Takaya Azumi, Wako (JP); Naoto Shibui, Wako (JP); Satoru Masuda, Yokohama (JP)

(73) Assignees: Honda Motor Co., Ltd., Tokyo (JP); Otsuka Koki Co., Ltd., Kanagawa (JP)

( * ) Notice: Subject to any disclaimer, the term of this patent is extended or adjusted under 35 U.S.C. 154(b) by 0 days.

(21) Appl. No.: 13/147,061

(22) PCT Filed: Feb. 1, 2010

(86) PCT No.: PCT/JP2010/051344
§ 371 (c)(1),
(2), (4) Date: Aug. 16, 2011

(87) PCT Pub. No.: WO2010/090155
PCT Pub. Date: Aug. 12, 2010

(65) Prior Publication Data
US 2011/0290064 A1    Dec. 1, 2011

(30) Foreign Application Priority Data
Feb. 6, 2009    (JP) .................. 2009-025794

(51) Int. Cl.
G05G 5/06    (2006.01)
G05G 1/04    (2006.01)
B60T 7/10    (2006.01)

(52) U.S. Cl.
USPC ............. 74/540; 74/535; 74/523; 74/501.5 R (58) Field of Classification Search
USPC ............................ 74/526, 540, 501.5 R, 535
See application file for complete search history.

(56) References Cited

U.S. PATENT DOCUMENTS

| | | | |
|---|---|---|---|
| 3,216,276 A | | 11/1965 | Nagy |
| 5,001,942 A | * | 3/1991 | Boyer .............................. 74/535 |
| 5,205,184 A | * | 4/1993 | Noel et al. ....................... 74/538 |
| 5,303,610 A | | 4/1994 | Noel et al. |
| 5,467,666 A | | 11/1995 | Soucie et al. |
| 5,527,095 A | * | 6/1996 | Marshall et al. ............ 297/270.1 |
| 6,105,459 A | * | 8/2000 | Troiano .......................... 74/542 |

(Continued)

FOREIGN PATENT DOCUMENTS

| | | |
|---|---|---|
| DE | 20 2004 014335 U1 | 11/2004 |
| DE | 10 2004 049270 A1 | 4/2006 |
| EP | 0 499 494 A1 | 8/1992 |

(Continued)

*Primary Examiner* — Thomas R Hannon
*Assistant Examiner* — Kashif Mohammed
(74) *Attorney, Agent, or Firm* — Carrier Blackman & Associates, P.C.; William D. Blackman; Joseph P. Carrier (57) ABSTRACT

In a parking brake system, a locking tooth of a ratchet plate includes a first area for contacting and retaining a locking claw of a ratchet pawl in an equilibrium state when a parking brake lever is pulled up; and a second area in which the locking claw remains in a state of halfway engagement of tooth tips when a pressing force of a release rod is released. When the locking claw comes into contact with a portion closer to a tip of the locking tooth beyond the first area, a line of force is maintained due to the pressing force of the release rod. The system is configured such that even if an occupant erroneously pulls up the parking brake lever while the release rod is pressed, it is possible to reliably prevent halfway engagement of tooth tips in a ratchet mechanism.

7 Claims, 8 Drawing Sheets

(56) References Cited

U.S. PATENT DOCUMENTS

| | | | |
|---|---|---|---|
| 6,817,264 B2 * | 11/2004 | Hiura et al. | 74/512 |
| 7,562,603 B2 | 7/2009 | Momozu et al. | |
| 7,587,960 B2 * | 9/2009 | Tsuzuki et al. | 74/523 |
| 7,650,815 B2 * | 1/2010 | Revelis et al. | 74/526 |
| 7,748,290 B2 * | 7/2010 | Choi | 74/537 |
| 7,779,722 B2 | 8/2010 | Kawano et al. | |
| 8,006,588 B2 * | 8/2011 | Kowalski et al. | 74/523 |
| 2003/0019317 A1 | 1/2003 | Dittmar et al. | |

FOREIGN PATENT DOCUMENTS

| | | | |
|---|---|---|---|
| EP | 0 509 870 A1 | | 10/1992 |
| EP | 1 759 944 A2 | | 3/2007 |
| FR | 1 206 819 A | | 2/1960 |
| JP | 56-111056 | | 8/1981 |
| JP | 5-56710 U | | 7/1993 |
| JP | 2001-180460 A | | 7/2001 |
| JP | 2001180460 A | * | 7/2001 |
| JP | 2001-233188 A | | 8/2001 |
| JP | 2007-161183 A | | 6/2007 |

* cited by examiner

PARKING BRAKE SYSTEM

TECHNICAL FIELD

The present invention relates to a parking brake system including: a parking brake lever swingably pivotally supported on a vehicle body, and capable of being pulled up so as to drag a brake cable; a ratchet pawl pivotally supported on the parking brake lever via a fulcrum pin; a ratchet plate fixed to the vehicle body, and including a plurality of locking teeth and a plurality of locking grooves arranged alternately, a locking claw of the ratchet pawl capable of engaging with the locking teeth and the locking grooves; and a release rod configured to press the ratchet pawl in accordance with an occupant's release operation to make the ratchet pawl swing in a direction in which the locking claw is disengaged from the locking grooves.

BACKGROUND ART

Such a parking brake system is known from Patent Document 1 below.
Patent Document 1: Japanese Patent Application Laid-open No. 2007-161183

DISCLOSURE OF INVENTION

Problems to be Solved by the Invention

Meanwhile, with regard to the parking brake system of this kind, a parking brake lever is automatically held in an operational position by a ratchet mechanism when an occupant pulls up the parking brake lever to the operational position without pressing a release rod; and the parking brake lever is automatically pulled down to a nonoperational position by a tensile force of a brake cable once the occupant disengages the ratchet mechanism by pressing the release rod while the parking brake lever is in the operational position.

Nevertheless, the occupant sometimes pulls up the parking brake lever to the operational position while slightly pressing the release rod. In this case, when the occupant releases the pulling force after pulling the parking brake lever up to the operational position, the parking brake lever is sometimes stuck with a locking claw of a ratchet pawl not fully engaging with any locking tooth of a ratchet plate, and the tip of the locking claw of the ratchet pawl engages with the tip of a locking tooth of the ratchet plate (hereinafter referred to as "in the state of halfway engagement of tooth tips"). This is a phenomenon which occurs only when the tip of the locking claw of the ratchet pawl is in contact with the tip of a locking tooth of the ratchet plate. The tip of each locking tooth of the ratchet plate is provided with an angle in order that, when the locking claw of the ratchet pawl comes in contact with a part of the locking tooth which is deeper than the tooth tip thereof, the fitting of the ratchet pawl into the ratchet plate can be facilitated.

The present invention has been made with the foregoing situation taken into consideration. An object of the present invention is to securely prevent a ratchet mechanism from causing the state of halfway engagement of tooth tips, and accordingly to fit a ratchet pawl into a ratchet plate fully, even when an occupant pulls up a parking brake lever to an operational position while pressing a release rod.

Means for Solving the Problems

In order to attain the above object, according to a first aspect of the present invention, there is proposed a parking brake system including: a parking brake lever swingably pivotally supported on a vehicle body, and capable of being pulled up so as to drag a brake cable; a ratchet pawl pivotally supported on the parking brake lever via a fulcrum pin; a ratchet plate fixed to the vehicle body, and including a plurality of locking teeth and a plurality of locking grooves arranged alternately, a locking claw of the ratchet pawl capable of engaging with the locking teeth and the locking grooves; and a release rod configured to press the ratchet pawl in accordance with an occupant's release operation to make the ratchet pawl swing in a direction in which the locking claw is disengaged from the locking grooves, characterized in that a predetermined clearance is provided between the ratchet pawl and the fulcrum pin, a direction of a first straight line and a direction of a second straight line are set different from each other, the first straight line representing a straight line on which a point of contact between the ratchet pawl and the release rod, a center of an arc of one of the locking teeth, and a center of an arc of the locking claw exist while a tip of the locking tooth and a tip of the locking claw are in contact with each other, the second straight line representing a straight line on which a point of contact between the fulcrum pin and the ratchet pawl, the center of the arc of the locking tooth, and the center of the arc of the locking claw exist while the tip of the locking tooth and the tip of the locking claw are in contact with each other, and the ratchet pawl is movable relative to the release rod.

Furthermore, according to a second aspect of the present invention, in addition to the first aspect, there is proposed the parking brake system, wherein a first equilibrium state takes place in a case where, when an occupant's pulling-up force on the parking brake lever is substantially equal to a tensile force of the brake cable, the tip of the locking tooth and the tip of the locking claw come into contact with each other due to a pressing force of the release rod on the ratchet pawl, and the first straight line exists under this condition, a second equilibrium state takes place in a case where, when the occupant's pulling-up force on the parking brake lever is substantially 0 (zero), the tip of the locking tooth and the tip of the locking claw come into contact with each other due to the tensile force of the brake cable, and the second straight line exists under this condition, the first equilibrium state and the second equilibrium state take place, respectively, in predetermined areas, each of whose centers is a point of contact between the locking tooth and the locking claw, and in which the equilibrium state accompanied with existence of the first straight line and the equilibrium state accompanied with existence of the second straight line take place, respectively, and the area in which the first equilibrium state takes place and the area in which the second equilibrium state takes place do not overlap each other.

Here, a bracket 11 of an embodiment corresponds to the vehicle body of the present invention.

Effects of the Invention

According to the first aspect of the present invention, once the occupant pulls up the parking brake lever, the locking claw of the ratchet pawl moves while slipping on the locking teeth and the locking grooves of the ratchet plate one after another; and once the occupant releases the pulling force on the parking brake lever after the parking brake lever reaches an operational position, the locking claw engages with one locking groove, and the parking brake lever is held at the operational position. Once the occupant presses the release rod under this condition, the ratchet pawl swings due to the release rod, the locking claw and the locking groove are disengaged from each other, and the parking brake lever is pulled down toward a nonoperational position due to a tensile force of the brake cable.

Under the condition that the occupant's pulling force on the parking brake lever is substantially in equilibrium with the tensile force of the brake cable after the parking brake lever is pulled up while a disengagement force is caused to act on the ratchet pawl by being pressed by the release rod, if the locking claw of the ratchet pawl comes into contact with the locking tooth of the ratchet plate, without releasing an occupant's finger from the push button, at a position closer to the tip of the locking tooth beyond the position (the first area of the embodiment) at which the locking claw comes into contact with the locking tooth when the point (b) of contact, the center (O1) of the arc of the locking tooth, and the center (O2) of the arc of the locking claw exist on one straight line, the release rod and the fulcrum pin descend accordingly as the parking brake lever is pulled down by releasing the parking brake lever from the pulling-up force under such a condition. However, until the fulcrum pin works by the clearance, the force of the fulcrum pin in the descending direction is not transmitted to the ratchet pawl, but the force with which the release rod descends is transmitted to the ratchet pawl. This force is further transmitted to the ratchet plate via the ratchet pawl. On this occasion, since the locking claw is in contact with the locking tooth at the position closer to the tooth tip, a reaction force from the ratchet plate to the ratchet pawl is divided into components, and a force is applied to the locking claw in a direction in which the locking claw comes off the locking tooth. Thus, the ratchet pawl swings with the point (b) of the contact between the ratchet pawl and the release rod being a fulcrum, and the locking claw accordingly slides toward the tip of the locking tooth. As a result, the ratchet pawl comes off the ratchet plate before the pull-down force from the fulcrum pin is transmitted to the ratchet plate. For this reason, it is possible to prevent the occurrence of the state of halfway engagement of tooth tips. In this event, the locking claw of the ratchet pawl is capable of sliding toward the tip of the locking tooth of the ratchet plate without hindrance, because the ratchet pawl is designed to be capable of moving relative to the release rod. In this case, the occupant is urged to operate the parking brake lever again.

Furthermore, in a case where the locking claw of the ratchet pawl comes into contact with the locking tooth of the ratchet plate (in the first area of the embodiment) while the point (b) of contact, the center (O1) of the arc of the locking tooth, and the center (O2) of the arc of the locking claw exists on one straight line, as described above, the force with which the release rod descends is transmitted to the ratchet pawl once the pulling force on the parking brake lever is released. However, load from the release rod constitutes a force which acts along a straight line extending in the same direction as a reaction force from the ratchet pawl acts. On this occasion, since the tensile force of the brake cable is stronger than a forced needed to press the release rod (the push button) for the purpose of operating the release rod, the ratchet pawl operates by the clearance while the release rod (the push button) is slightly returned. In other words, the fulcrum pin and the ratchet pawl moves relative to each other in accordance with the clearance, and the point (a) of the contact between the fulcrum pin and the ratchet pawl shifts accordingly. The load accordingly shifts the direction of its action from a direction (F1) to a direction (F2). The direction (F1) is a direction of a load which keeps the tip of the locking tooth and the tip of the locking claw in contact with and in equilibrium with each other while a straight line joining the point of the contact between the ratchet pawl and the release rod, the center of the arc of the locking tooth, and the center of the arc of the locking claw exists. The direction (F2) is a direction of a load which keeps the tip of the locking tooth and the tip of the locking claw in contact with and in equilibrium with each other while a straight line joining the point of the contact between the fulcrum pin and the ratchet pawl, the center of the arc of the locking tooth, and the center of the arc of the locking claw exists. After the shift of the direction of the load's action, once the disengagement force acting on the ratchet pawl from the release rod is released, the ratchet pawl swings in a direction in which the locking claw comes into engagement with the locking tooth of the ratchet plate. For this reason, the locking tooth and the locking claw can be fully fitted together with the locking claw engaging with the locking groove.

Further, according to the second aspect of the present invention, it is possible to securely cause either the swing of the locking claw toward the tip of the locking tooth or the swing of the locking claw in the engagement direction, which can be obtained by the configuration of claim 1, and accordingly to securely prevent the state of halfway engagement. That is because, although the first equilibrium state and the second equilibrium state take place in their respective predetermined areas with the point (c) of the contact between the locking tooth and the locking claw being the center in accordance with the friction between the locking tooth and the locking claw, an area (S1) in which the first equilibrium state takes place and an area (S2) in which the second equilibrium state takes place do not overlap each other, and no point (c) of the contact between the locking tooth and the locking claw is included in both the area.

EXPLANATION OF REFERENCE NUMERALS AND SYMBOLS

11 Bracket (vehicle body)
13 Parking brake lever
14 Brake cable
17 Ratchet plate
17a Locking tooth
17b Locking groove 18 Fulcrum pin
19 Ratchet pawl
19c Locking claw
23 Release rod

BEST MODE FOR CARRYING OUT THE INVENTION

A mode for carrying out the present invention is explained below based on the attached drawings.

First Embodiment

FIGS. 1 to 8 show an embodiment of the present invention.

Figure 1:
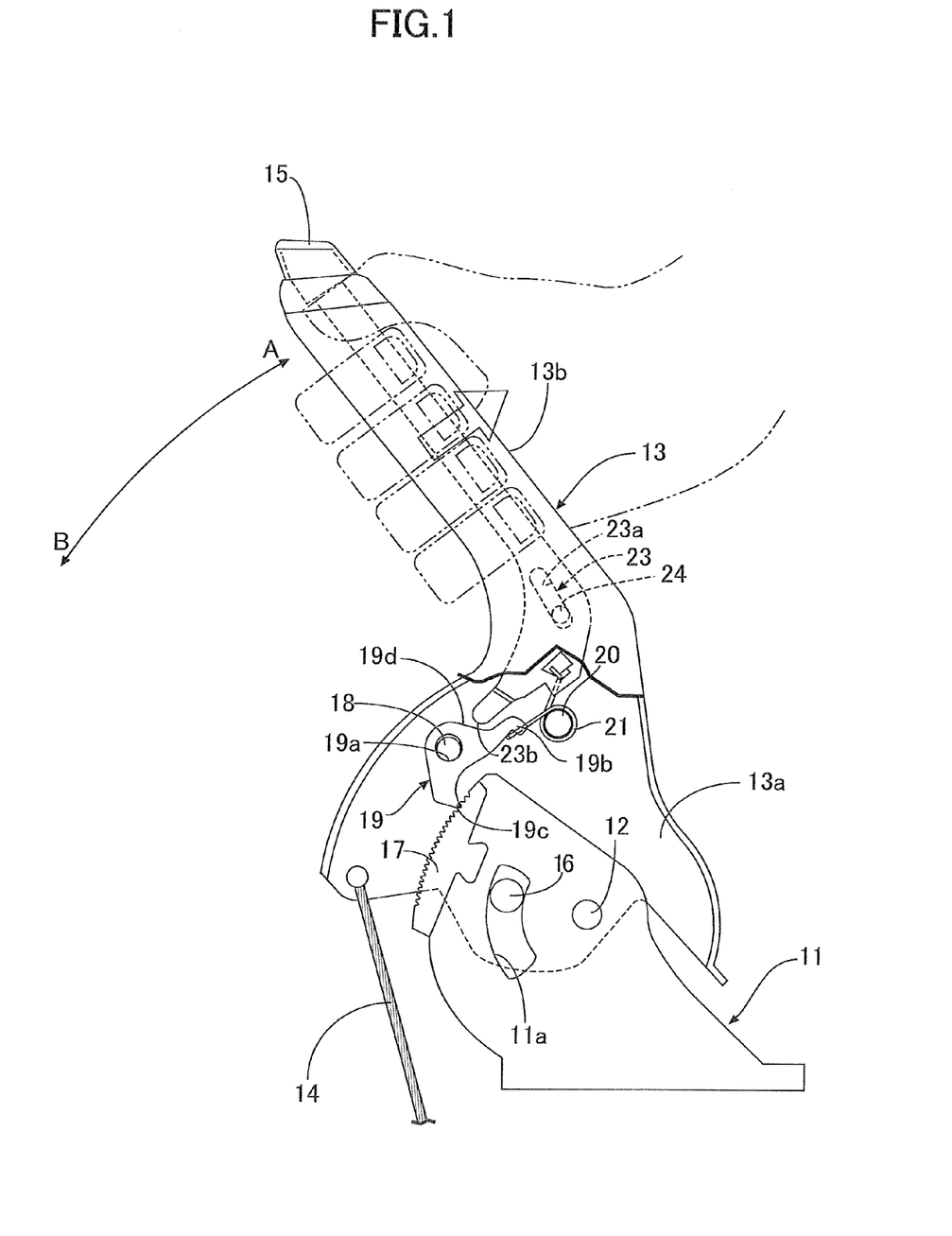
FIG. 1 is a view showing a state in which a parking brake lever is pulled up to an operational position by a normal operation. (first embodiment)
Figure 2:
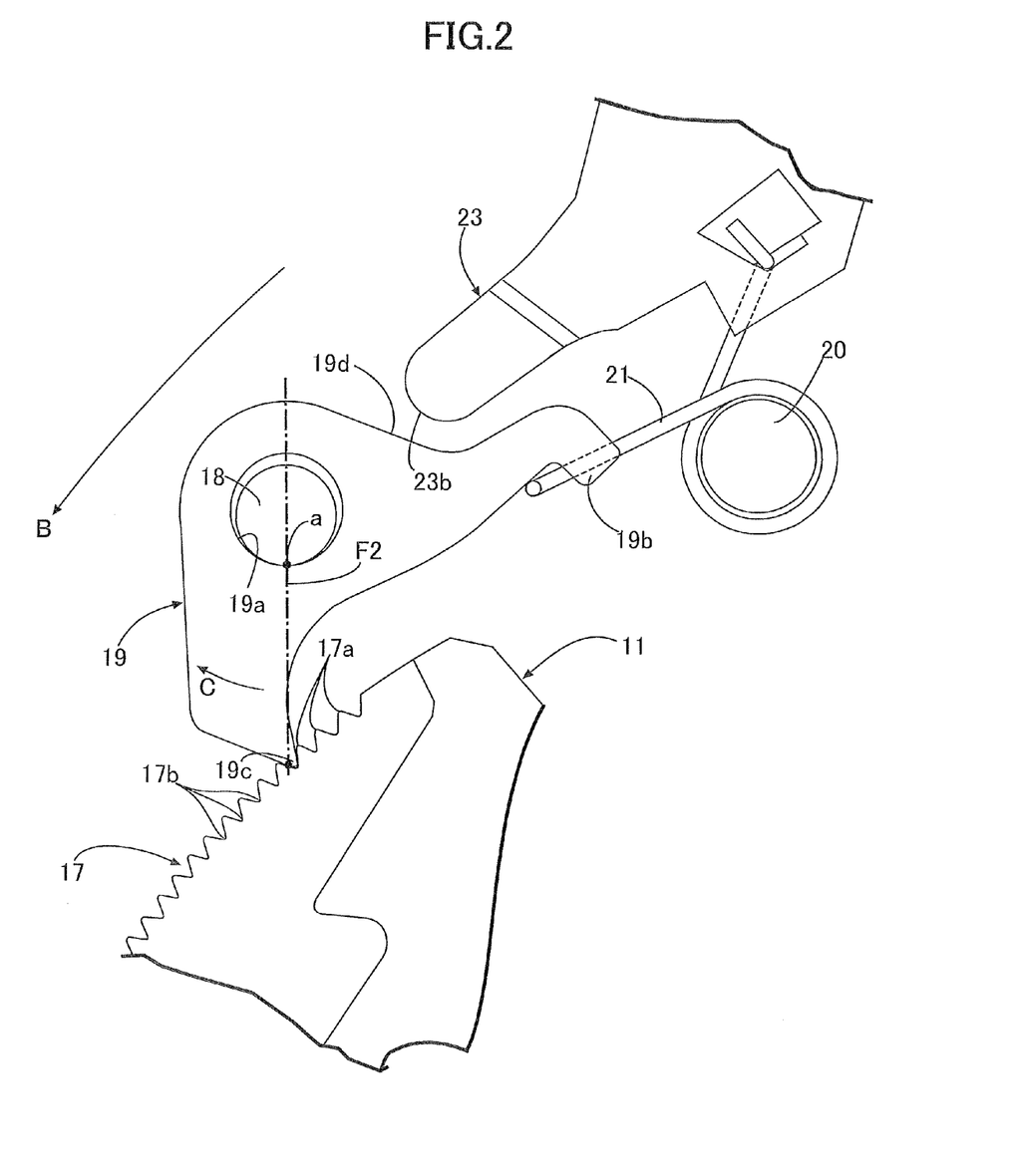
FIG. 2 is an enlarged view of an essential part in FIG. 1. (first embodiment)

As shown in FIGS. 1 and 2, a parking brake system provided in a vehicle compartment of an automobile includes a parking brake lever 13 which is pivotally supported on a bracket 11 fixed to a vehicle body in a way that the parking brake lever 13 is swingable about a pivot 12. The parking brake lever 13 includes: a base portion 13a pivotally supported by the pivot 12; and a grip portion 13b extending forwardly upward from the base portion. An end of a brake cable 14 is connected to the base portion 13a, and a push button 15 is provided to an extremity of the grip portion 13b. A swingable range of the parking brake lever 13 is restricted by the engagement of a guide pin 16, which is fixed to the base portion 13a, with an arcuate guide slot 11a which is formed in the bracket 11, and which is formed in an arc shape whose center is the pivot 12.

A ratchet plate 17 formed in an arc shape whose center is the pivot 12 is fixed to the bracket 11 with multiple locking teeth 17a, . . . and multiple locking grooves 17b, . . . alternately formed in the ratchet plate 17 (see FIG. 2). In addition, a supporting hole 19a of a ratchet pawl 19 is swingably pivotally supported by a fulcrum pin 18 fixed to the base portion 13a of the parking brake lever 13 with a slight clearance set between the fulcrum pin 18 and the supporting hole 19a. A middle portion of a twist spring 21 is supported by a boss portion 20 provided on the base portion 13a of the parking brake lever 13. An end of the twist spring 21 is locked to an end of a release rod 23, which will be described later. The other end of the twist spring 21 is locked to a spring engagement portion 19b in an end of the ratchet pawl 19. The ratchet pawl 19 is biased by a resilient force of this twist spring 21 in a counterclockwise direction in FIG. 1. A locking claw 19c provided in the other end of the ratchet pawl 19 is biased in a direction in which the locking claw 19c engages with the locking grooves 17b of the ratchet plate 17.

The release rod 23 is placed inside the grip portion 13b of the parking brake lever 13. A long hole 23a formed in an intermediate portion of the release rod 23 swingably engages with a guide pin 24 which is provided to the parking brake lever 13. An end of the release rod 23 is connected to the push button 15. A pressing surface 23b formed in an arc shape in the other end of the release rod 23 is capable of coming into contact with a flat pressed surface 19d of the ratchet pawl 19. For this reason, once an occupant presses the push button 15, the release rod 23 whose long hole 23a is guided by the guide pin 24 moves; thus, the pressing surface 23b of the release rod 23 presses the pressed surface 19d; and accordingly, the ratchet pawl 19 swings against the resilient force of the twist spring 21 in a clockwise direction, that is, in the direction as the locking claw 19c is detached from the locking grooves 17b of the ratchet plate 17.

Figure 5A:
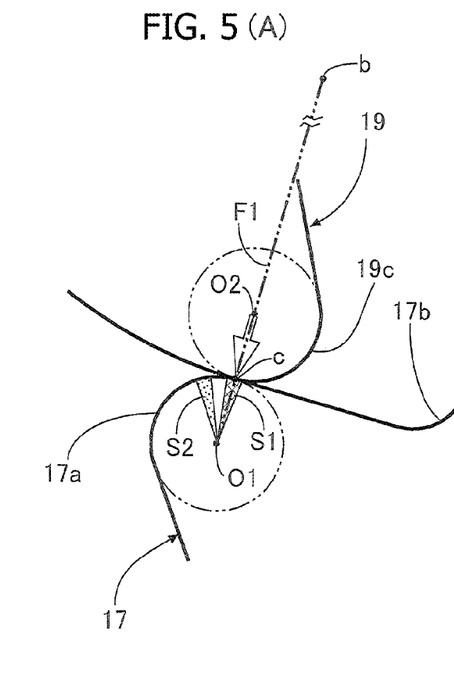
FIG. 5 is a view explaining operations of releasing an equilibrium state when the parking brake lever is pulled up to the operational position while pushing the push button. (first embodiment)

A first straight line direction (see a line of force F1 in FIG. 5(A)) and a second straight line direction (see a line of force F2 in FIG. 6) are set different from each other. In this respect, the first straight line direction is defined as a direction of a straight line on which a point b of the contact between the ratchet pawl 19 and the release rod 23, the center O1 of the arc of the locking tooth 17a, and the center O2 of the arc of the locking claw 19c exist while the tip of the locking tooth 17a and the tip of the locking claw 19c are in contact with each other. The second straight line direction is defined as a direction of a straight line on which a point a of the contact between the fulcrum pin 18 and ratchet pawl 19, the center O1 of the arc of the locking tooth 17a, and the center O2 of the arc of the locking claw 19c exist while the tip of the locking tooth 17a and the tip of the locking claw 19c are in contact with each other.

Next, descriptions will be provided for operations of the embodiment of the present invention including the foregoing configuration.

In FIG. 1, once the occupant pulls up the parking brake lever 13 in a direction indicated by an arrow A for the purpose of causing the parking brake to be operated, the ratchet pawl 19 supported on the parking brake lever 13 moves upward along the ratchet plate 17 fixed to the bracket 11. During this time, the ratchet pawl 19 is biased by the twist spring 21 in the direction as the locking claw 19c of the ratchet pawl 19 is put into contact with the locking teeth 17a, . . . and the locking grooves 17b, . . . of the ratchet plate 17. For this reason, the ratchet pawl 19 moves upward while the locking claw 19c is climbing over the locking teeth 17a of the ratchet plate 17 one after another with clicks. During this time, the occupant does not press the push button 15 of the parking brake lever 13. For this reason, the pressing surface 23b of the release rod 23 is slightly spaced apart from the pressed surface 19d of the ratchet pawl 19, and the swing of the ratchet pawl 19 about the fulcrum pin 18 is not hindered by the release rod 23.

Once the parking brake lever 13 is released from the pulling-up force when load applied to the brake cable 14 fully increases as a result of dragging the brake cable 14 in accordance with the pull up of the parking brake lever 13, the parking brake lever 13 is pulled by a tensile force of the brake cable 14 in a direction indicated by an arrow B. When the locking claw 19c of the ratchet pawl 19 engages with one of the locking grooves 17b of the ratchet plate 17, the parking brake lever 13 is held at the operational position. On this occasion, the parking brake is put in the operative condition by the brake cable 14, and the tensile force of the brake cable 14 is pulling the parking brake lever 13 in the direction indicated by the arrow B. However, since the locking claw 19c of the ratchet pawl 19 engages with the locking groove 17b of the ratchet plate 17, the parking brake lever 13 is never pulled back.

The resilient force of the twist spring 21 is negligibly smaller than the tensile force of the brake cable 14, and the release rod 23 is spaced away from the ratchet pawl 19. For these reasons, load acting on the ratchet pawl 19 consists only of load transmitted from the fulcrum pin 18 of the parking brake lever 13 which is biased in a pull-down direction (in the direction indicated by the arrow B) by the tensile force of the brake cable 14. Accordingly, the line of force F2, which represents load acting on the engagement part between the locking claw 19c of the ratchet pawl 19 and the locking groove 17b of the ratchet plate 17, passes the point a of the contact between the supporting hole 19a and the fulcrum pin 18 (see FIG. 2).

Once the occupant presses the push button 15 for the purpose of releasing the parking brake, the release rod 23 whose long hole 23a is guided by the guide pin 24 moves. Thus, the pressing surface 23b of the release rod 23 presses the pressed surface 19d of the ratchet pawl 19. Thereby, the ratchet pawl 19 swings about the fulcrum pin 18 in a direction indicated by an arrow C in FIG. 2 against the resilient force of the twist spring 21, and the locking claw 19c is detached from the locking groove 17b of the ratchet plate 17. As a result, the tensile force of the brake cable 14 causes the parking brake lever 13 to swing in the direction indicated by the arrow B and to return to the nonoperational position.

Figure 3:
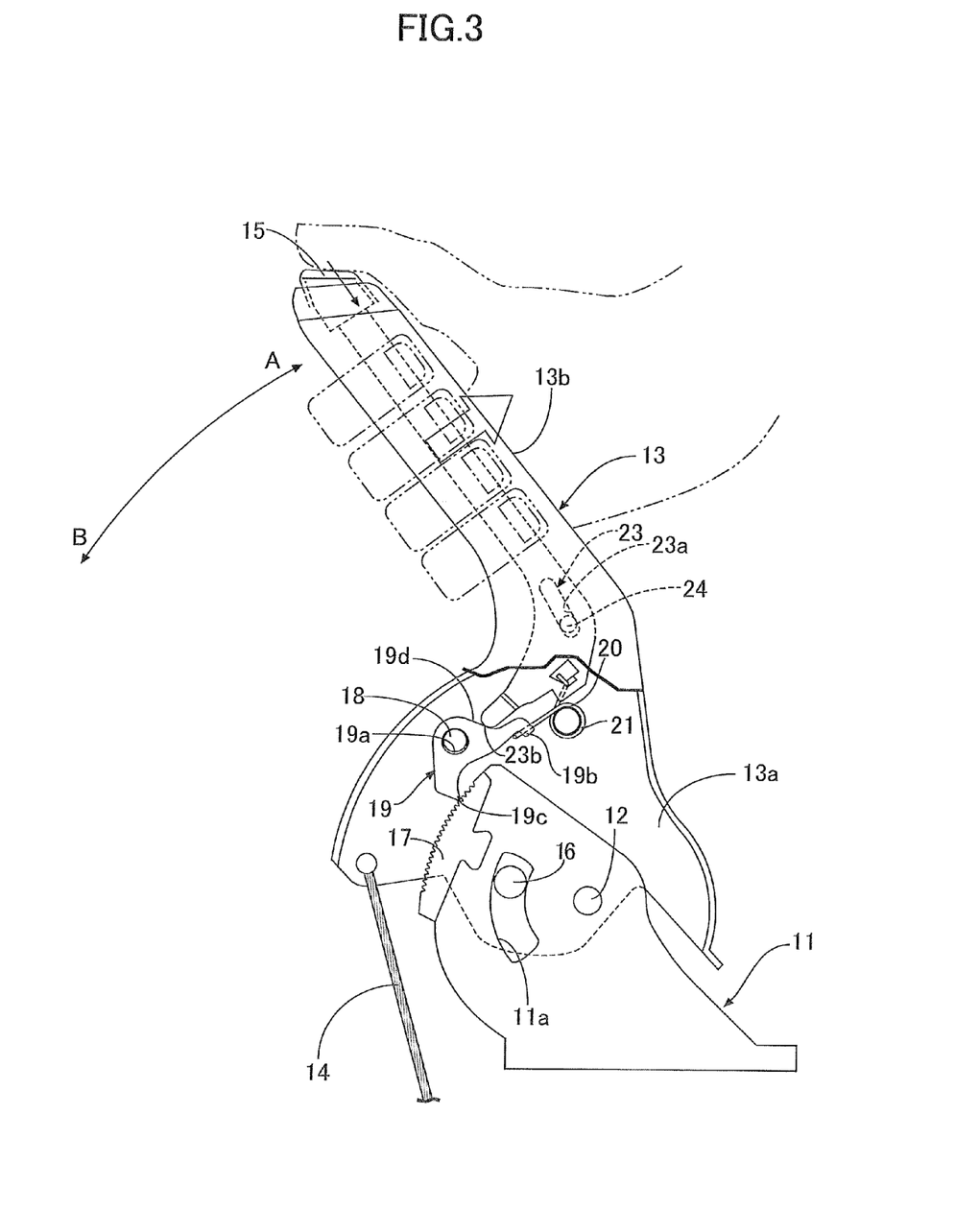
FIG. 3 is a view showing a state in which the parking brake lever is pulled up to the operational position while pushing a push button. (first embodiment)
Figure 4:
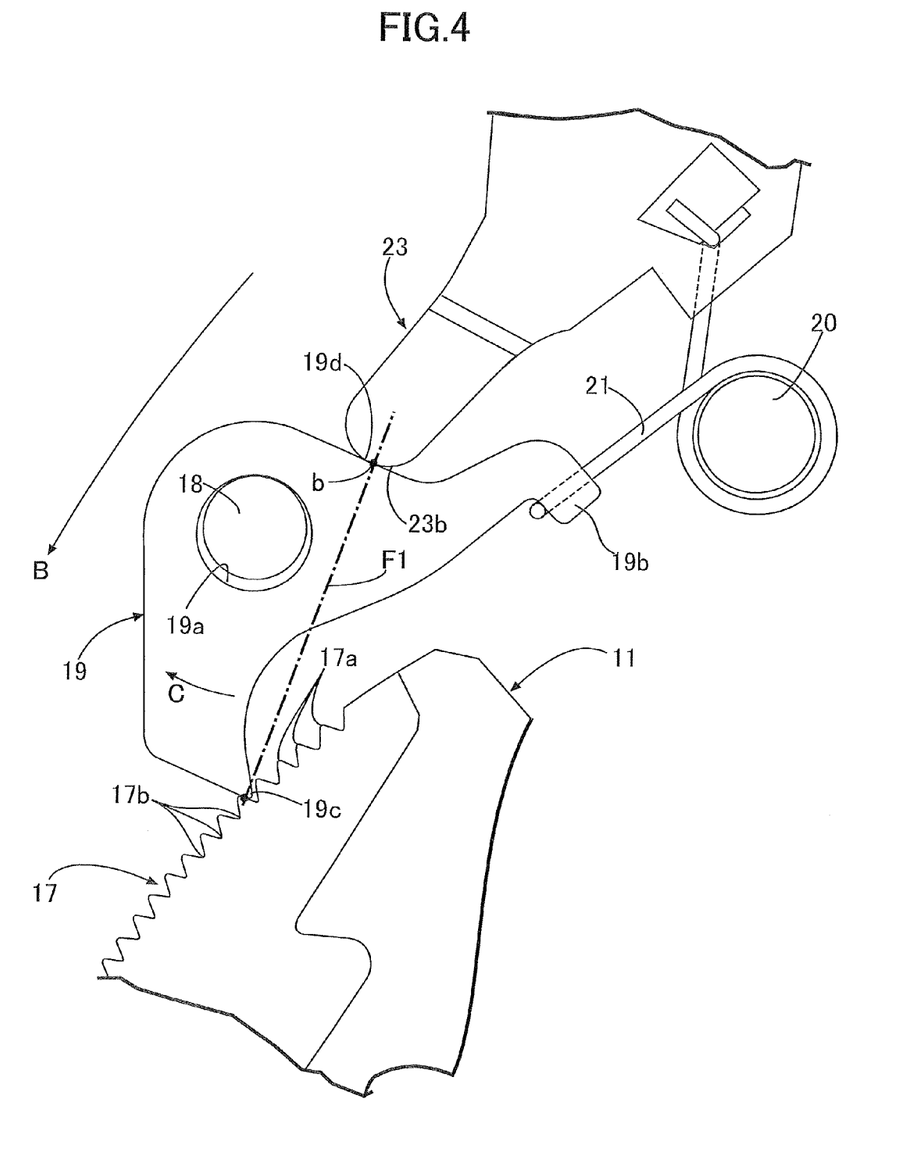
FIG. 4 is an enlarged view of an essential part in FIG. 3. (first embodiment)

Meanwhile, as is sometimes the case, the occupant pulls up the parking brake lever 13 while slightly pressing the push button 15 although the occupant is expected to pull up the parking brake lever 13 without pressing the push button 15. In this case, because the push button 15 is pressed down as shown in FIGS. 3 and 4, the pressed surface 19d is pressed by the pressing surface 23b of the release rod 23, and the ratchet pawl 19 thus swings in the direction indicated by the arrow C. Accordingly, the parking brake lever 13 is pulled up to the operational position with the locking claw 19c intermittently coming into contact with the tips of the locking teeth 17a, . . . of the ratchet plate 17 one after another.

As is sometimes the case, while the parking brake lever 13 is at the operational position, a near-end portion of the locking claw 19c of the ratchet pawl 19 comes into engagement with, and accordingly is stuck at, a near-end portion of the locking tooth 17a of the ratchet plate 17 in an equilibrium state when the tip of the locking tooth 17a and the tip of the locking claw 19c comes into contact with each other without releasing an occupant's finger from the push button 15 under the condition that the occupant's pulling force on the parking brake lever 13 is substantially in equilibrium with the tensile force of the brake cable 14 (see FIG. 4).

FIG. 5(A) enlargingly shows an area in which the locking claw 19c and the locking tooth 17a engage with each other on this occasion. The tip portion of the locking claw 19c and the tip portion of the locking tooth 17a are both formed in an arc shape. An equilibrium state occurs when the line of force F1 representing the direction of the load which occurs when the release rod 23 presses the ratchet pawl 19 passes the center O2 of the arc of the locking claw 19c, the center O1 of the arc of the locking tooth 17a, and the point b of the contact between the release rod 23 and the ratchet pawl 19 under the condition that the occupant's pulling force on the parking brake lever 13 is substantially in equilibrium with the tensile force of the brake cable 14. If the coefficient of friction between the locking claw 19c and the locking tooth 17a would be 0 (zero), a point which makes the locking claw 19c and the locking tooth 17a engage with each other in the equilibrium state would be only the point c. In reality, however, since the coefficient of friction between the locking claw 19c and the locking tooth 17a is approximately 0.1, the locking claw 19c and the locking tooth 17a can engage with each other in the equilibrium state in a first area S1 is formed of a sector shape whose center is the point c, and whose central angle is approximately 12 degrees.

In other words, it is only when the locking claw 19c is in contact with the first area S1 of the locking tooth 17a that the locking claw 19c and the locking tooth 17a engage with each other in the equilibrium state under the condition that: the occupant's pulling force on the parking brake lever 13 is substantially in equilibrium with the tensile force of the brake cable 14; and the occupant is slightly pressing the push button 15.

Figure 6:
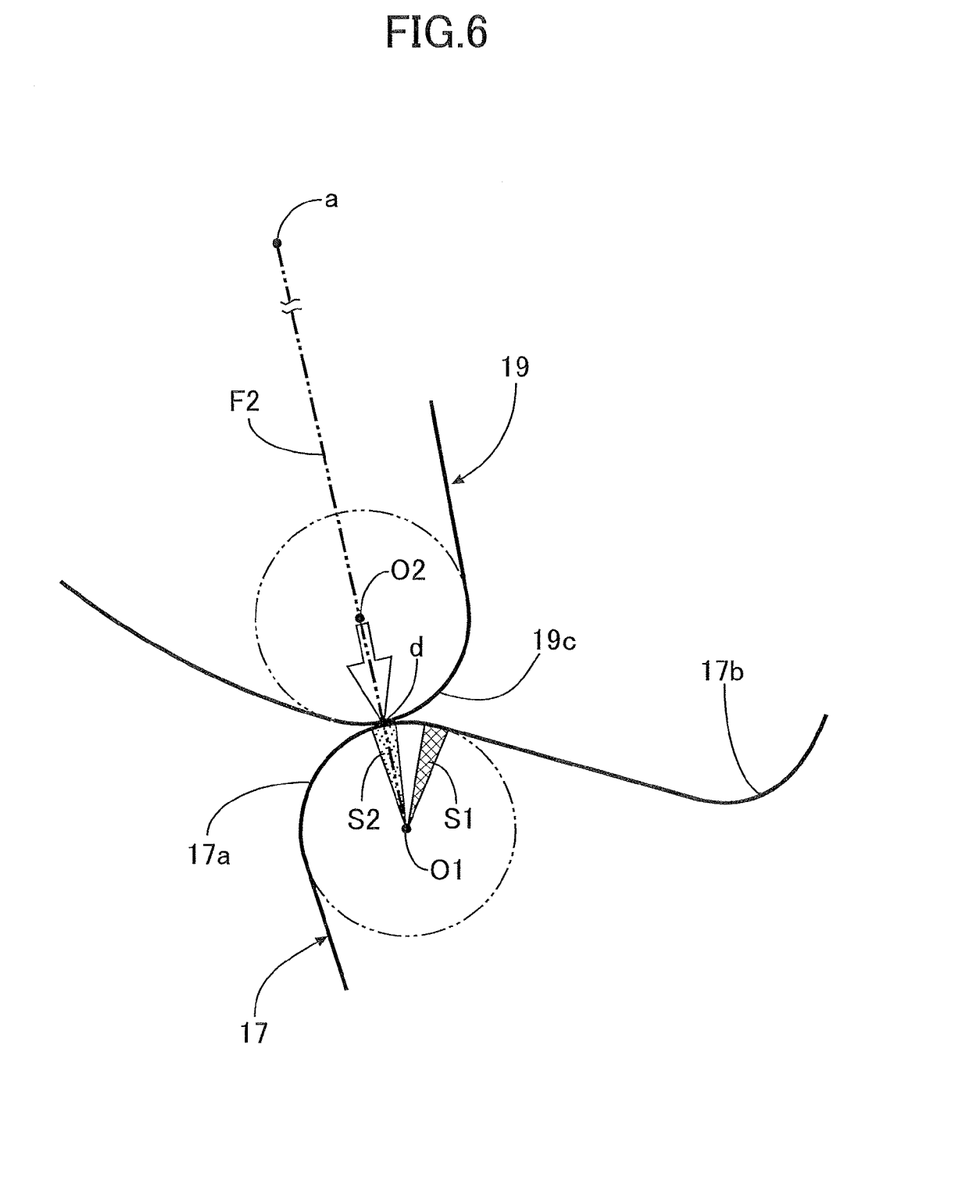
FIG. 6 is an operation explanatory view when a halfway engagement of tooth tips occurs. (first embodiment)
Figure 7:
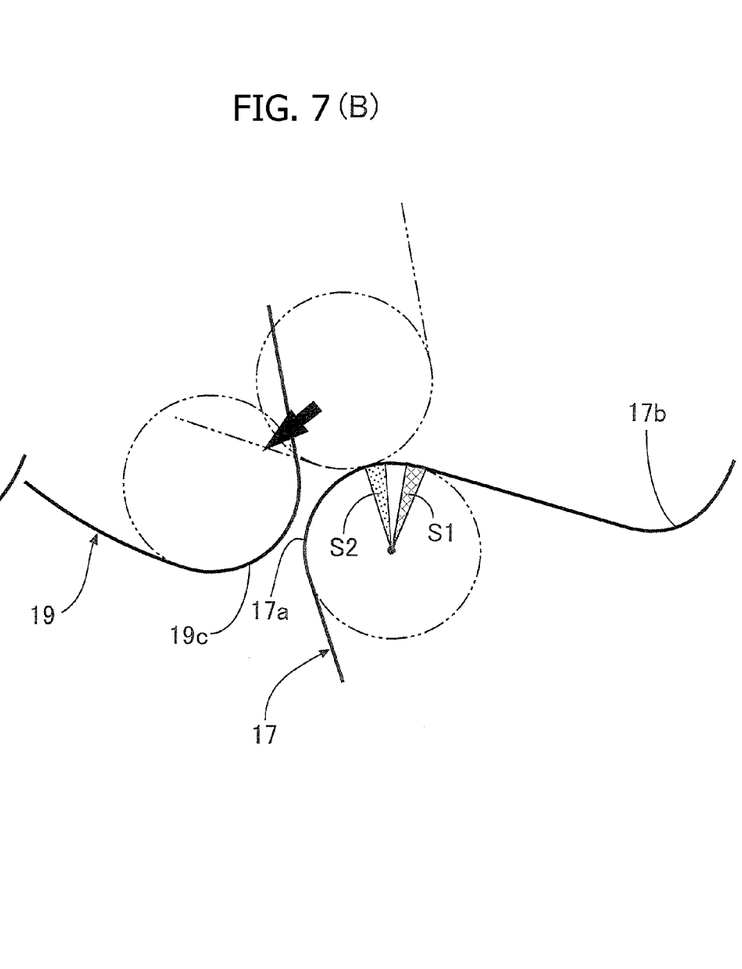
FIG. 7 is a view (part 1) explaining operations of a case in which an equilibrium state is not occurred when the parking brake lever is pulled up to the operational position while pushing the push button. (first embodiment)

In this respect, let us think about a second area S2 in which the halfway engagement of tooth tips occurs. As shown in FIG. 6, the force with which the pressing surface 23b of the release rod 23 presses the pressed surface 19d of the ratchet pawl 19 is negligible, while the occupant's pulling force on the parking brake lever 13 is released under the condition that the occupant is slightly pressing the push button 15, that is, while the tensile force of the brake cable 14 is pulling the barking brake lever 13 downward. In other words, the tensile force of the brake cable 14 causes the locking claw 19c and the locking tooth 17a to engage with each other. In this respect, the state of halfway engagement occurs in a case where the line of force F2 produced by the ratchet pawl 19 via the fulcrum pin 18 due to the tensile force of the brake cable 14 passes the center O2 of the arc of the locking claw 19c, the center O1 of the arc of the locking tooth 17a, and the point a of the contact between the fulcrum pin 18 and the ratchet pawl 19 (see FIG. 6). Even if, while in this state, the occupant releases the push button 15 from the slightly pressing condition, the direction of the line of force F2 does not change and the state of halfway engagement is accordingly maintained, because the parking brake lever 13 is already pulled down by the tensile force of the brake cable 14. The second area S2 deviates toward the tip of the locking tooth 17a beyond the first area S1 because of the difference between the direction of the line of force F1 and the direction of the line of force F2, which will be described later.

In this respect, it is only when the locking claw 19c is in contact with and held by the second area S2 of the locking tooth 17a that the locking claw 19c and the locking tooth 17a engage with each other in the state of halfway engagement of tooth tips. However, the present invention enables the locking claw 19c to slide on the locking tooth 17a and subsequently engage with the corresponding locking groove 17b without causing such a state, which will be described later.

Next, descriptions will be provided for an operation of a case where the occupant releases the push button 15 after stopping pulling up the parking brake lever 13 while pressing the push button 15.

Once the occupant pulls up the parking brake lever 13 while slightly pressing the push button 15, the parking brake lever 13 is pulled up to the operational position while the locking claw 19c intermittently contacts the tips of the locking teeth 17a, . . . of the ratchet plate 17 one after another. In this respect, while the parking brake lever 13 is at the operational position, if the locking claw 19c happens to come into contact with the first area S1 of the locking tooth 17a without releasing an occupant's finger from the push button 15 in a case where, as shown in FIG. 5(A), the point b of contact, the center O1 of the arc of the locking tooth 17a, and the center O2 of the arc of the locking claw 19c exist on one straight line under the condition that the occupant's pulling force on the parking brake lever 13 is substantially in equilibrium with the tensile force of the brake cable 14, the locking claw 19c and the locking tooth 17a come into engagement with each other in the equilibrium state.

Thereafter, once the occupant reduces the pulling force on the parking brake lever 13 without getting the finger off the push button 15, the fulcrum pin 18 and the release rod 23 are biased downward by the tensile force of the brake cable 14. Since the slight clearance is formed between the supporting hole 19a of the ratchet pawl 19 and the fulcrum pin 18, and additionally since the tensile force of the brake cable 14 is stronger than the force needed to press the push button 15 for operating the release rod 23, a motion which pushes up the ratchet pawl 19 relative to the ratchet plate 17 in the ratchet circumference direction by the clearance occurs while the push button 15 is slightly returned. Thereby, the supporting hole 19a of the ratchet pawl 19 and the fulcrum pin 18 comes into contact with each other at the point a (see FIG. 2), and the line of force F2 which occurs when the parking brake lever 13 is pulled downward by the tensile force of the brake cable 14 rises accordingly. For this reason, the equilibrium area shifts from the first area S1 to the second area S2. On this occasion, once the restriction on the counterclockwise turn of the ratchet pawl 19 is released by releasing the push button 15, the locking claw 19c is no longer in equilibrium with the locking tooth 17a on the line of force F2, and the locking claw 19c slides in the meshing direction, because the locking claw 19c is originally situated in the area S1.

In addition, in a case where, as shown in FIG. 7(A), the locking claw 19c comes in contact with the locking tooth 17a at, for example, a point c closer to the tooth tip beyond the first area S1 without getting the occupant's finger off the push button 15 under the condition that the occupant's pulling force on the parking brake lever 13 is substantially in equilibrium with the tensile force of the brake cable 14, the fulcrum pin 18 and the release rod 23 are pulled down accordingly as the tensile force of the brake cable 14 pulls down the parking brake lever 13 once the occupant releases the pulling force on the parking brake lever 13 while slightly pressing the push button 15.

On this occasion, because of the clearance between the fulcrum pin 18 and the ratchet pawl 19, until the fulcrum pin 18 works by the clearance, the force of the fulcrum pin 18 in the descending direction is not transmitted to the ratchet pawl 19, but the force with which the release rod 23 descends is transmitted to the ratchet pawl 19. This force is further transmitted to the ratchet plate 17 via the ratchet pawl 19. On this occasion, because the locking claw 19c is in contact with the locking tooth 17a at a position closer to the tooth tip beyond the first area S1, the reaction force from the ratchet plate 17 to the ratchet pawl 19 is divided into components. As a result, a force is applied to the locking claw 19c in a direction in which the locking claw 19c comes off the locking tooth 17a. Thus, the ratchet pawl 19 swings in the clockwise direction in FIG. 4 with the point b as a fulcrum at which the pressing surface 23b of the release rod 23 and the pressed surface 19d of the ratchet pawl 19 come in contact with each other. Hence, as shown in FIG. 7(B), the locking claw 19c slides toward the tooth tip of the locking tooth 17a, and the locking claw 19c of the ratchet pawl 19 comes off the locking tooth 17a, before the line of force F2 occurs due to the transmission of the pull-down force from the fulcrum pin 18 to the ratchet plate 17. For this reason, the parking brake lever 13 is returned by the tensile force of the brake cable 14, and the occupant is accordingly made to know that the parking brake lever 13 is unlocked. By this, the occupant can be urged to operate the parking brake lever 13 again.

In this respect, if the pressing surface 23b of the release rod 23 and the pressed surface 19d of the ratchet pawl 19 would be incapable of sliding on each other, that is, if a recess portion provided to one of the pressing surface 23b and the pressed surface 19d would engage with a projecting portion provided to the other of the pressing surface 23b and the pressed surface 19d, the locking claw 19c would be unable to slide on the locking tooth 17a unlike the case shown in FIG. 7(B). However, the embodiment imposes no restriction on the movement of the pressing surface 23b of the release rod 23 and the pressed surface 19d of the ratchet pawl 19 relative to each other. For this reason, the ratchet pawl 19 is capable of swinging freely, and the locking claw 19c is capable of sliding freely relative to the locking tooth 17a. Accordingly, the embodiment makes it possible to securely disengage the locking claw 19c from the locking tooth 17a.

Figure 8A:
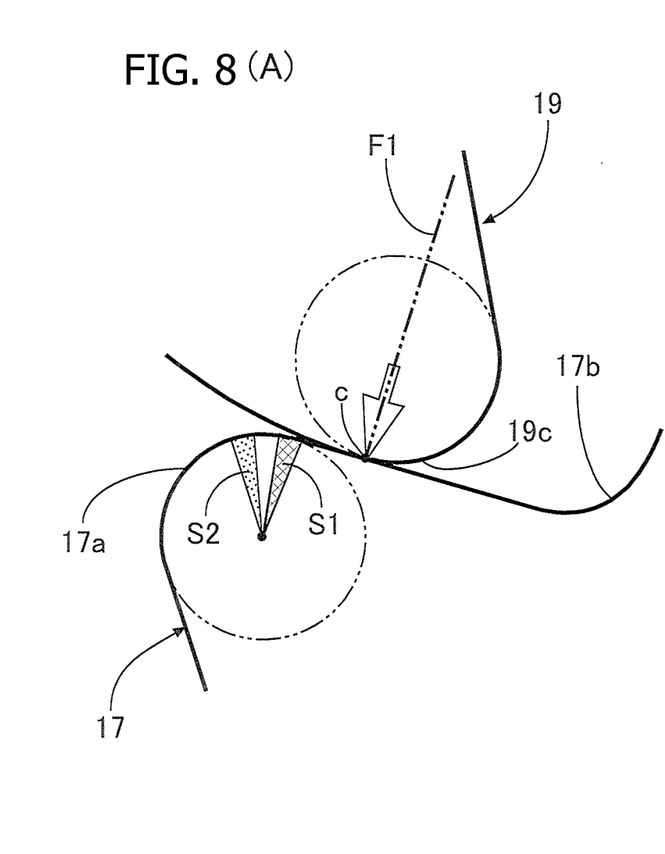
FIG. 8 is a view (part 2) explaining operations of an equilibrium state when the parking brake lever is pulled up to the operational position while pushing the push button. (first embodiment)
Figure 8B:
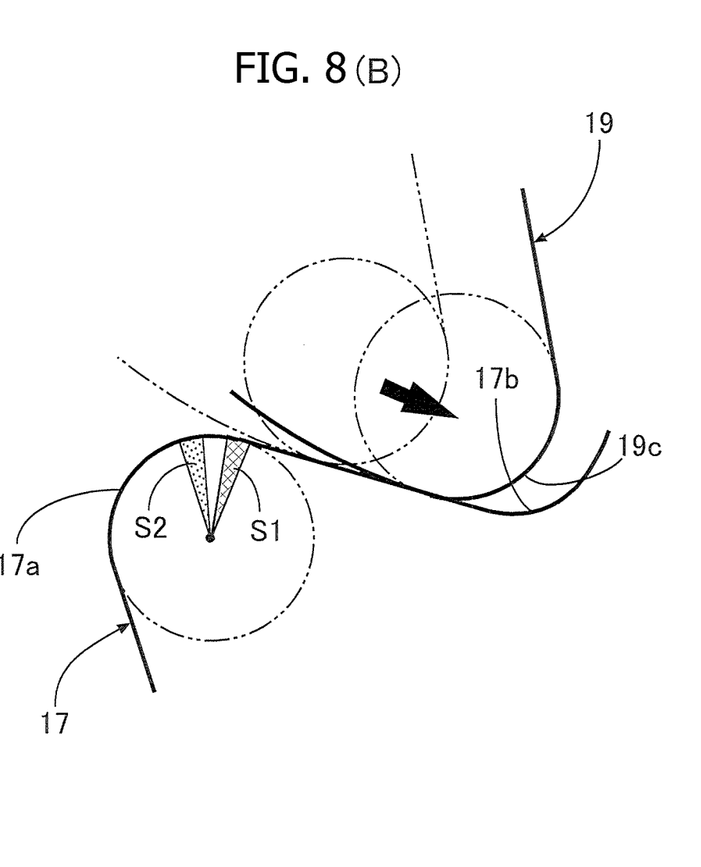

Furthermore, in a case where, as shown in FIG. 8(A), the locking claw 19c comes in contact with the locking tooth 17a at a point c closer to the tooth base beyond the first area S1 after the parking brake lever 13 is pulled up with the push button slightly pressed, the locking claw 19c and the locking tooth 17a are unable to engage with each other in the equilibrium state. Like in the operations shown in FIG. 5, once the push button 15 is released, the restriction on the ratchet pawl 19 by the release rod 23 is released, and the locking claw 19c thus slides toward the tooth base of the locking tooth 17a, as shown in FIG. 8(B). Accordingly, the locking claw 19c and the locking tooth 17a are brought in full engagement with each other, and the operation of the parking brake lever 13 is normally completed.

Figure 5B:
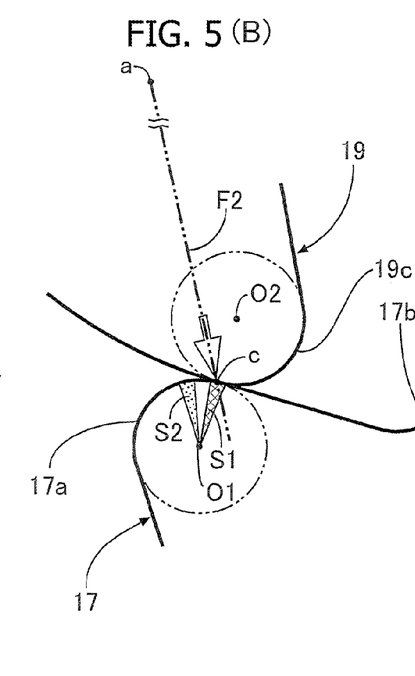
Figure 5C:
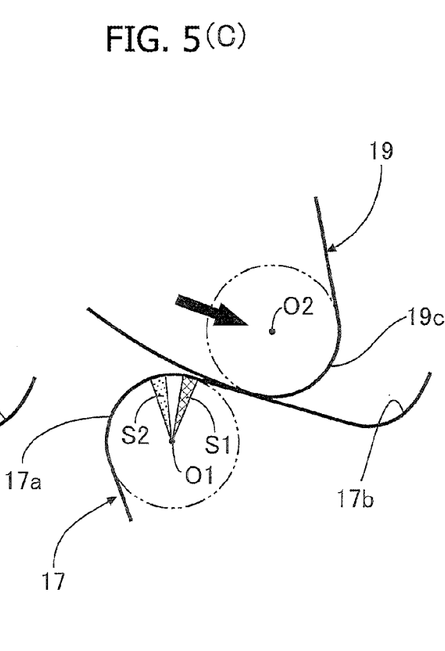

Meanwhile, in a case where, as described by use of FIG. 5(A), the locking claw 19c and the locking tooth 17a are in engagement with each other in the equilibrium state at the point c in the first area 51, once the occupant releases the parking brake lever 13, the load with which the fulcrum pin 18 presses the supporting hole 19a of the ratchet pawl 19 due to the tensile force of the brake cable 14 becomes larger than the load with which the pressing surface 23b of the release rod 23 presses the pressed surface 19d of the ratchet pawl 19. For this reason, as shown in FIG. 5(B), the line of force finally shifts from F1 to F2.

As described by use of FIG. 6, the line of force F2 is that on which, while the parking brake lever 13 is pulled downward by the tensile force of the brake cable 14, the locking claw 19c and the locking tooth 17a engages with each other in the state of halfway engagement of tooth tips in the second area S2 even if the occupant does not press the push button 15. As described above, in the case where, the locking claw 19c and the locking tooth 17a engages with each other in the equilibrium state in the first area S1, load acting in the direction of the line of force F1 is actually needed to keep the engagement of the locking claw 19c with the locking tooth 17a in the equilibrium state in the first area S1. However, since the line of force shifts from F1 to F2 as a result of the occupant's release of the parking brake lever 13 (see FIG. 5(B)), once the push button 15 is released, the locking claw 19c and the locking tooth 17a are no longer kept engaged with each other in the equilibrium state in the first area S1. Accordingly, the locking claw 19c slides on the locking tooth 17a toward its tooth base, and the working of the parking brake is normally completed (see FIG. 5(C)).

As described above, even if the equilibrium state occurs after the occupant pulls up the parking brake lever 13 while slightly pressing the push button 15, the line of force shifts from the first line of force F1 to the second line of force F2 once the tensile force of the brake cable 14 acts mainly. In the case where the equilibrium is established in the first area S1, the state of halfway engagement of tooth tips is securely solved once the occupant finally gets the finger off the push button 15. In the case where the contact is established near the tooth tip beyond the first area S1, the locking claw 19c comes off the locking tooth 17a before an area shift entailing the occurrence of the equilibrium in the second area S2, and the occupant is urged to operate the parking brake lever again. For this reason, the working of the parking brake lever 13 does not end with the state of halfway engagement of the tooth tips.

Although the foregoing descriptions have been provided for the embodiment of the present invention, the present invention may be variously changed in design within the scope not departing from the gist of the present invention.

For example, the embodiment enables the release rod 23 and the ratchet pawl 19 to move relative to each other by forming the pressing surface 23b of the release rod 23 as the arc-shaped surface, and the pressed surface 19d of the ratchet pawl 19 as the flat surface. However, in a case where a recess portion to be formed in one of the release rod 23 and the ratchet pawl 19 is made to engage with a projecting portion to be formed on the other of the release rod 23 and the ratchet pawl 19, a predetermined play needs to be provided between the recess portion and the projecting portion for the purpose of solving the halfway engagement of the tooth tips by allowing the release rod 23 and the ratchet pawl 19 to move relative to each other. This configuration is capable of restraining the ratchet pawl 19 from making an unnecessary swing motion.

Nevertheless, even in the case where the play is provided to the area of the engagement between the recess portion and the projecting portion of the release rod 23 and the ratchet pawl 19, the ratchet pawl 19 needs to be biased toward the release rod 23 by use of a spring for the purpose of always maintaining the position of the ratchet pawl 19 relative to the position of the release rod 23 within a certain range.

The invention claimed is:

1. A parking brake system comprising:
   a parking brake lever which is capable of being pulled up so as to drag a brake cable, and is swingably pivotally supported on a bracket which is connected to a vehicle body, the parking brake lever comprising a base portion which is pivotally supported on the bracket by a pivot connection, and a grip portion extending upwardly from the base portion;
   a ratchet pawl pivotally supported on the parking brake lever via a fulcrum pin, the ratchet pawl having a spring engagement portion at a first end thereof, and a locking claw at a second end thereof, wherein a predetermined clearance is provided between the ratchet pawl and the fulcrum pin;
   a ratchet plate affixed to the bracket, and including a plurality of locking teeth and a plurality of locking grooves arranged alternately, wherein the locking claw of the ratchet pawl is capable of engaging with the locking teeth and the locking grooves;
   a release rod configured to press the ratchet pawl in accordance with an occupant's release operation to make the ratchet pawl swing in a direction in which the locking claw is disengaged from the locking grooves; and
   a torsion spring mounted on a boss on the base portion of the parking brake lever, the torsion spring having a first end operatively connected to a lower end portion of the release rod, and a second end operatively connected to the spring engagement portion of the ratchet pawl;
   wherein a direction of a first straight line and a direction of a second straight line are set different from each other, the first straight line representing a straight line on which a point of contact between the ratchet pawl and the release rod, a center of an arc of one of the locking teeth and a center of an arc of the locking claw exist while a tip of the locking tooth and a tip of the locking claw are in contact with each other, the second straight line representing a straight line on which a point of contact between the fulcrum pin and the ratchet pawl, the center of the arc of the locking tooth, and the center of the arc of the locking claw exist while the tip of the locking tooth and the tip of the locking claw are in contact with each other,
   wherein when the release rod is disengaged, the locking claw moves from a position where the first straight line is established, toward a position where the locking claw is engaged with the locking groove while the ratchet pawl moves by said predetermined clearance,
   and wherein each of the locking teeth includes a respective tip end portion having an arcuate outline shape defining a respective tooth tip radial center point, and the ratchet claw includes a tip end portion formed in an arcuate outline shape defining a claw tip radial center point, to promote sliding movement of the ratchet claw in relation to a tooth tip during operation of the parking brake system.

2. The parking brake system according to claim 1, wherein:
   a first equilibrium state takes place in a case where, when an occupant's pulling-up force on the parking brake lever is substantially equal to a tensile force of the brake cable, the tip of a locking tooth and the tip of the locking claw come into contact with each other due to a pressing force of the release rod on the ratchet pawl, and the first straight line exists under this condition,
   a second equilibrium state takes place in a case where, when the occupant's pulling-up force on the parking brake lever is substantially zero, the tip of the locking tooth and the tip of the locking claw come into contact with each other due to the tensile force of the brake cable, and the second straight line exists under this condition, and
   the first equilibrium state and the second equilibrium state take place, respectively, in predetermined areas, each of whose centers is a point of contact between the locking tooth and the locking claw.

3. The parking brake system of claim 1, wherein when the release rod is disengaged, the ratchet pawl moves while the fulcrum pin moves by said clearance, whereby the ratchet pawl is displaced from a tooth tip side of the locking tooth in an engagement direction.

4. The parking brake system of claim 1, wherein the ratchet pawl is pivotally supported on the parking brake lever via a single fulcrum pin, and the ratchet pawl comprises a central portion having a single hole formed therein to receive the fulcrum pin, said hole being larger than the fulcrum pin to provide said predetermined clearance.

5. The parking brake system of claim 4, wherein:
   a boss portion is provided on a base portion of the parking brake lever,
   a torsion spring is mounted on said boss portion, and
   the release rod is connected to the ratchet pawl only by said torsion spring.

6. The parking brake system of claim 1, wherein said locking teeth have a first area in which a first equilibrium state occurs between the locking teeth and the locking claw when the release rod presses the ratchet pawl, and a second area in which a second equilibrium state occurs between the locking teeth and the locking claw when the ratchet pawl receives a load from the fulcrum pin, wherein said first area and said second area are not overlapped with each other.

7. The parking brake system of claim 1, wherein the release rod is connected to the ratchet pawl only by said torsion spring.

\* \* \* \* \*